United States Patent
Kanoh

(10) Patent No.: US 8,453,003 B2
(45) Date of Patent: May 28, 2013

(54) COMMUNICATION METHOD

(75) Inventor: Yasushi Kanoh, Tokyo (JP)

(73) Assignee: NEC Corporation, Tokyo (JP)

( * ) Notice: Subject to any disclaimer, the term of this patent is extended or adjusted under 35 U.S.C. 154(b) by 524 days.

(21) Appl. No.: 12/673,727

(22) PCT Filed: Apr. 9, 2008

(86) PCT No.: PCT/JP2008/056989
§ 371 (c)(1),
(2), (4) Date: Feb. 16, 2010

(87) PCT Pub. No.: WO2009/028231
PCT Pub. Date: Mar. 5, 2009

(65) Prior Publication Data
US 2011/0216860 A1    Sep. 8, 2011

(30) Foreign Application Priority Data
Aug. 24, 2007    (JP) ................................ 2007-218323

(51) Int. Cl.
G06F 15/163    (2006.01)
G06F 15/173    (2006.01)
G06F 15/177    (2006.01)

(52) U.S. Cl.
USPC ............... 713/375; 713/1; 713/100; 713/400; 713/500; 713/502; 717/149; 717/150; 712/1; 712/10; 712/11

(58) Field of Classification Search
USPC ......... 713/1, 2, 100, 375, 400–401, 500–503, 713/600–601; 717/149, 150; 712/1, 10, 11
See application file for complete search history.

(56) References Cited

U.S. PATENT DOCUMENTS

| | | | |
|---|---|---|---|
| 5,944,779 A * | 8/1999 | Blum ............................ | 709/201 |
| 2005/0050374 A1* | 3/2005 | Nakamura et al. ............ | 713/375 |
| 2006/0212868 A1* | 9/2006 | Takayama et al. ............ | 718/100 |
| 2007/0088777 A1* | 4/2007 | Maeda et al. ................. | 709/202 |

FOREIGN PATENT DOCUMENTS

| | | |
|---|---|---|
| JP | 5-290005 A | 11/1993 |
| JP | 8-263449 A | 10/1996 |
| JP | 2601591 A | 1/1997 |
| JP | 11-312148 A | 11/1999 |

OTHER PUBLICATIONS

International Search Report for PCT/JP2008/056989, mailed Jun. 17, 2008.
Supplementary European Search Report for EP 08 74 0092 dated Nov. 28, 2011.

(Continued)

*Primary Examiner* — Fahmida Rahman

(57) ABSTRACT

A communication method is provided to reduce an overhead of inter-processor synchronization for a communication phase in collective communication and to speed up the collective communication. Each of processors in a parallel computer start a previous process before a collective communication phase in which communications are performed at a same time among the processors through a inter-processor network. Each processor executes a synchronization command in advance at a time when a portion of the previous process for a predetermined time t is left. The inter-processor synchronization control section transmits a synchronization completion notice to each processor, if a synchronization condition is met. For the period, each processor executes the previous process in parallel. Then, the plurality of processors enter the collective communication phase.

8 Claims, 15 Drawing Sheets

OTHER PUBLICATIONS

C. J. Beckmann et al., "Fast Barrier Synchronization Hardware", Proceedings of the Supercomputing Conference, IEEE, 1990, pp. 180-189.

R. Gupta et al. "The Fuzzy Barrier: A Mechanism for High Speed Synchronization of Processors", ACM SIGARCH Computer Architecture News, ACM Special Interest Group on Computer Architecture, vol. 17, No. 2. 1989, pp. 54-63.

* cited by examiner

Fig. 5
(A) TIME REQUIRED FOR INTER-PROCESSOR SYNCHRONIZATION ≧
    TIME REQUIRED FOR REMAINING PROCESS (COMMUNICATION)
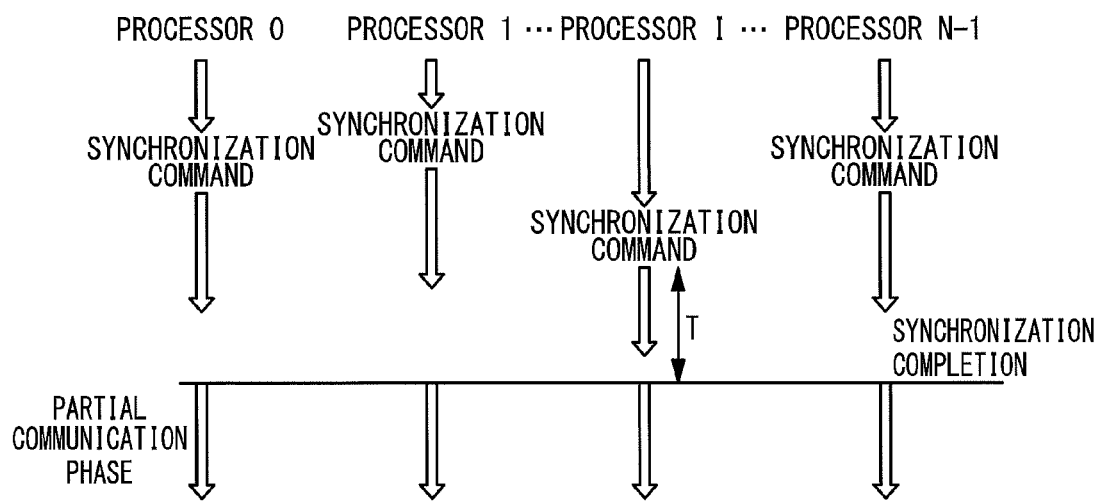
(B) TIME REQUIRED FOR INTER-PROCESSOR SYNCHRONIZATION <
    TIME REQUIRED FOR REMAINING PROCESS (COMMUNICATION)
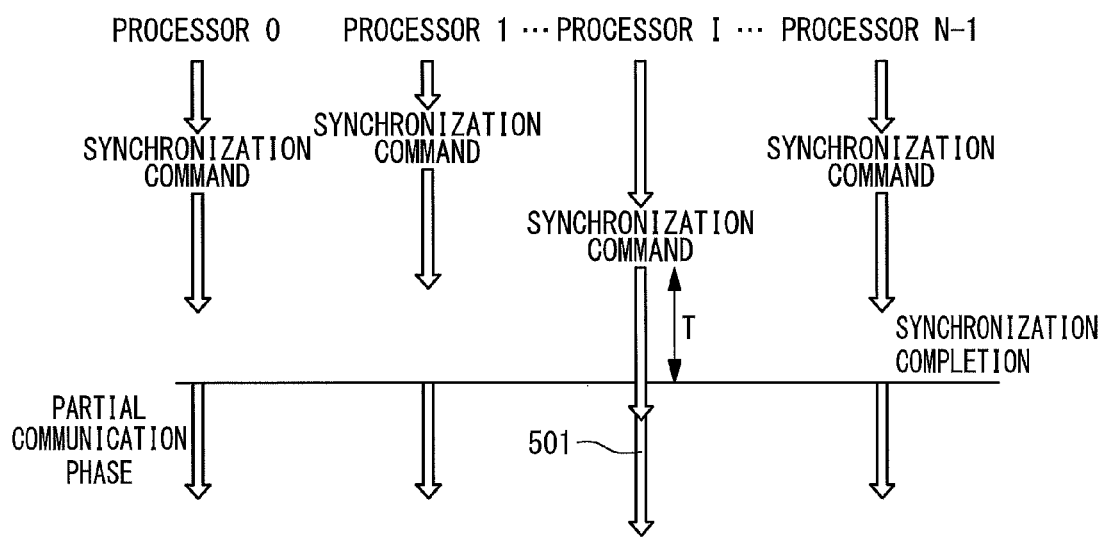

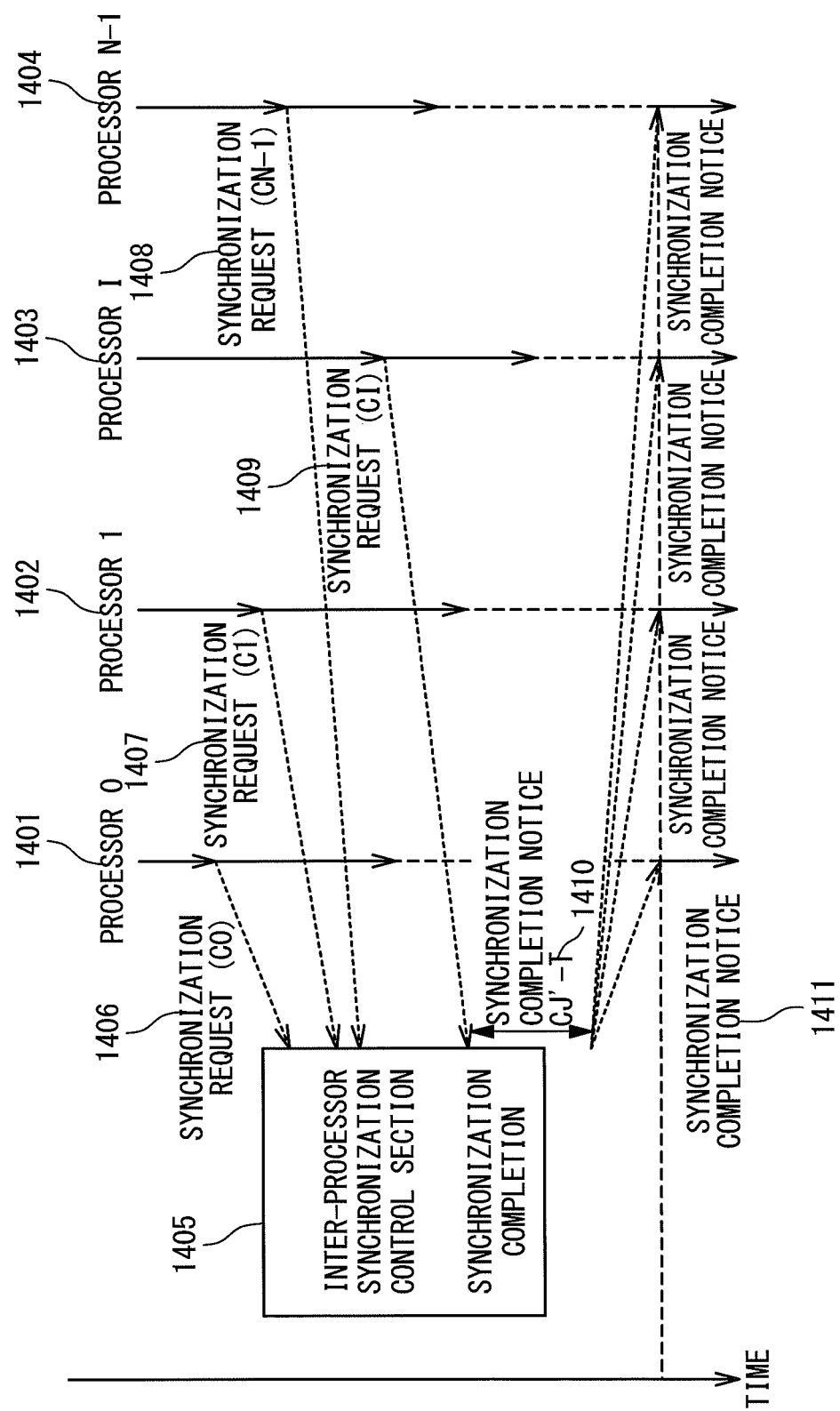

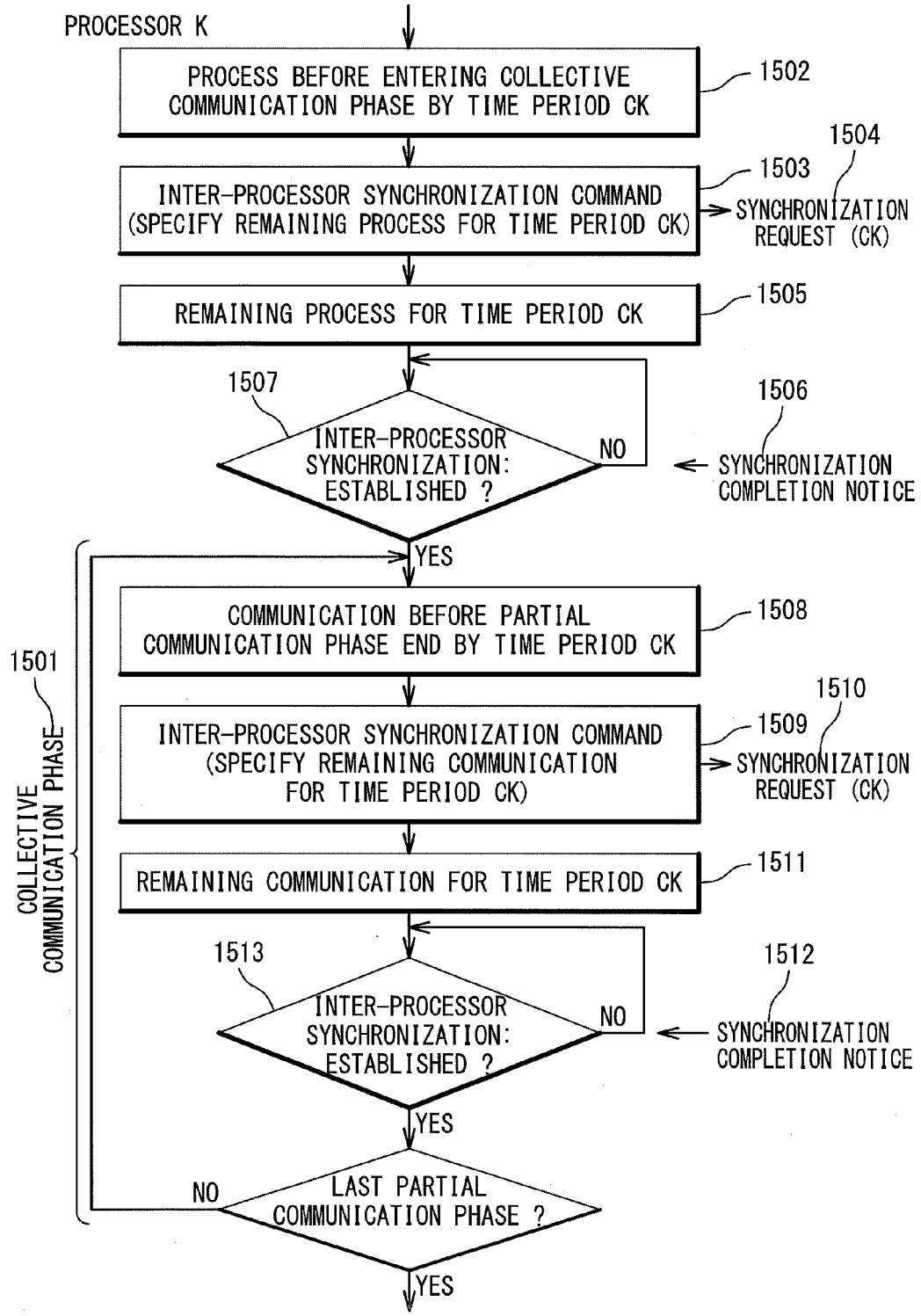

COMMUNICATION METHOD

This application is the National Phase of PCT/JP2008/056989, filed on Apr. 9, 2008, which is based on Japanese Patent Application No. 2007-218323 filed on Aug. 24, 2007 and claims benefits of a priority based on that application. Disclosure of the application is incorporated herein by reference.

TECHNICAL FIELD

The present invention relates to a communication method in a parallel computer with a plurality of processors connected through a network, and more specifically to a method of speeding up collective communication in which a plurality of processors communicates with each other simultaneously.

BACKGROUND ART

Collective communication in which the plurality of processors communicate with each other simultaneously is required to be possible to ensure that parallel processing is executed by a parallel computer having a plurality of processors connected through a network. Japanese Patent No. 2601591 describes a method when all processors of a parallel computer communicate with each other. FIG. 11 of this Japanese Patent shows a process flow of this method, in which an inter-processor synchronization is performed between all the processors during a phase of communication made with a specific communication destination (called a partial communication phase) to synchronize phases of all the processors. This is done for the purpose that communication destinations are simultaneously switched over all the processors through the phase synchronization. When it is not done, the phases of the processors shift, so that a collision between the communications occurs on a communication path, although the communications should not originally collide. For example, it is described in a phase management table in FIG. 9 of the Japanese Patent that there are a communication from PE2 to PE3 in a phase 2 and a communication from PE8 to PE3 in a phase 3. If PE8 enters the phase 3 and communicates with PE3 while PE2 is communicating with PE3 in the phase 2, the two communications with PE3 occur, thus halving performance. In this Japanese Patent, in order to avoid collision on a communication path, a phase management table is provided to perform the inter-processor synchronization over all the processors between phases. Thus, a method is proposed of synchronizing the phases between all the processors to allow high-speed communication between all the processors.

One of problems involved in the above related technique is in that a time for the inter-processor synchronization becomes an overhead of a time for an original communication, to degrade performance of the collective communication, since the inter-processor synchronization needs to be performed between one partial communication phase and another partial communication phase by all the processors participating in the collective communication. This is because some communications are required for the inter-processor synchronization between a plurality of processors, thus requiring some time period. Even if the plurality of processors execute inter-processor synchronization commands simultaneously, some time period is required for completion of the synchronization. This time required for the completion of inter-processor synchronization usually increases as the number of processors increases. This is because a large number of processors results in long physical distances between the processors. Therefore, as a size of the parallel computer increases, the time period required for the inter-processor synchronization increases, so that the overhead of the inter-processor synchronization between one partial communication phase and another partial communication phase increases in the related technique, resulting in performance degradation in the collective communication.

DISCLOSURE OF THE INVENTION

An object of the present invention is to provide a communication method of speeding up collective communication by reducing an overhead of inter-processor synchronization for synchronizing phases in the collective communication.

A communication method according to one aspect of the present invention is a communication method in a parallel computer including a plurality of processors, an inter-processor network connecting the plurality of processors, and an inter-processor synchronization control section for performing inter-processor synchronization between the plurality of processors. (1a) Each of the plurality of processors starts a previous process before entering a collective communication phase in which communication is performed simultaneously between the processors through the inter-processor network. (1b) When a predetermined time period t1 is left for the previous process, each processor executes a synchronization command in advance. (1c) In the execution of the synchronization command, each processor transmits a synchronization request to the inter-processor synchronization control section. (1d) The inter-processor synchronization control section receives the synchronization request from each processor. (1e) When the synchronization requests are received from all the plurality of processors and a synchronization condition is met, the inter-processor synchronization control section transmits a synchronization completion notice to each of the plurality of processors. (1f) Each processor receives the synchronization completion notice. (1g) Each processor executes the previous process in parallel with (1b) to (1f). (1h) After the above (1g), the plurality of processors enter the collective communication phase after confirming the reception of the synchronization completion notices.

The present invention can provide a communication method which eliminates overhead of inter-processor synchronization performed for synchronizing communication phases in collective communication to thereby speed up the collective communication.

BRIEF DESCRIPTION OF THE DRAWINGS

FIG. 5 is a diagram showing relationship between a time period T required for inter-processor synchronization and a time period required for the remaining process (communication);

FIG. 14 is a diagram illustrating an operation of the inter-processor synchronization control section according to the third exemplary embodiment; and FIG. 15 is a time chart illustrating operations of processors according to the third exemplary embodiment.

BEST MODE FOR CARRYING OUT THE INVENTION

In the present invention, by executing an inter-processor synchronization command in advance for a time period required for an inter-processor synchronization, the time for inter-processor synchronization can be hidden, and collective communication can be sped up, although the time has been overhead in the above related technique. Hereinafter, the present invention will be described in detail with reference to the attached drawings.

First Exemplary Embodiment

Figure 1:
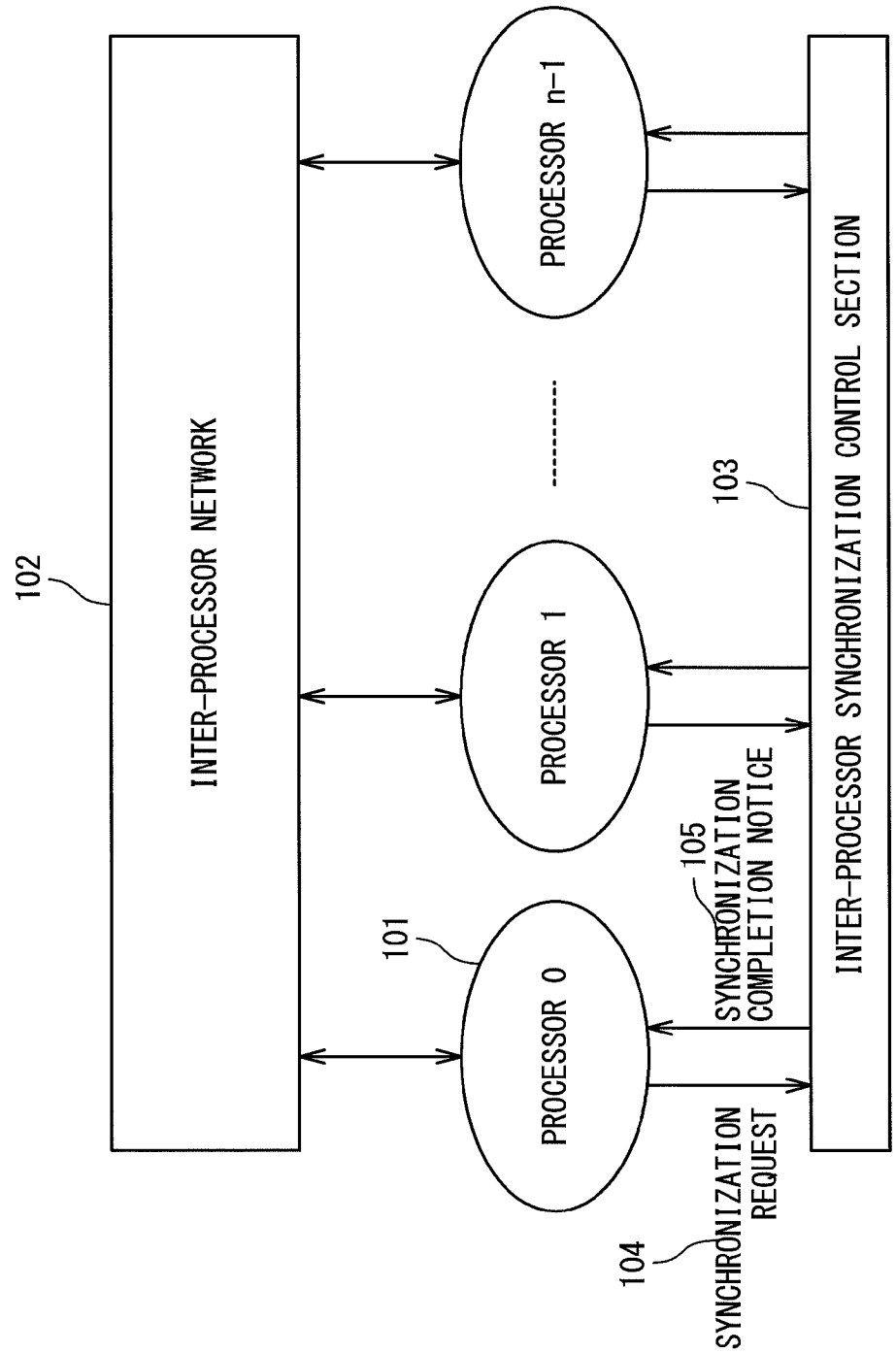
FIG. 1 is a diagram showing a parallel computer according to a first exemplary embodiment of the present invention.

Referring to FIG. 1, a parallel computer is shown as a first exemplary embodiment of the present invention. In FIG. 1, the parallel computer has a plurality of processors of a processor 0 101 and a processor 1 to a processor N−1. The plurality of processors are connected by an inter-processor network 102. The plurality of processors are also connected to an inter-processor synchronization control section 103. When the processor 0 101 executes an inter-processor synchronization command, a synchronization request 104 is transmitted to the inter-processor synchronization control section 103. When receiving the synchronization requests from all the processors, the inter-processor synchronization control section 103 transmits a synchronization completion notice 105 to the processor 0 101 and also transmits synchronization completion notices to all the other processors.

Figure 2:
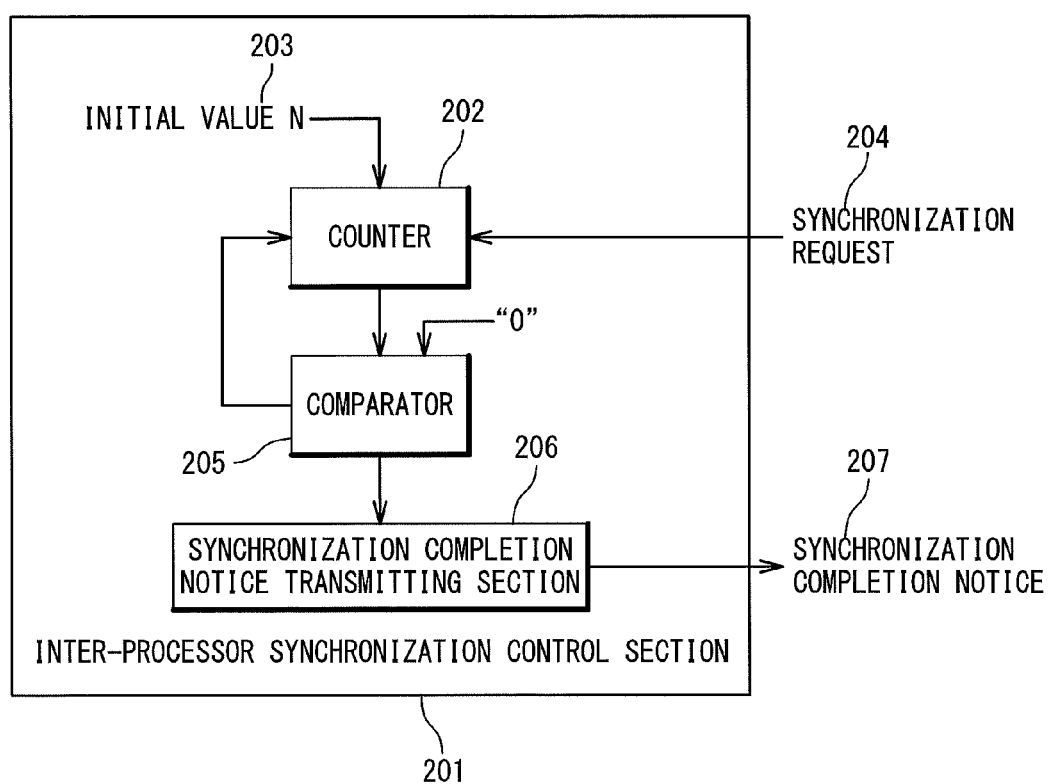
FIG. 2 is a diagram showing a configuration example of an inter-processor synchronization control section according to the first exemplary embodiment.

FIG. 2 shows a configuration example of the inter-processor synchronization control section 103 shown in FIG. 1. In an inter-processor synchronization control section 201, a counter 202 is built therein and a processor count N 203 is set as an initial value. When a synchronization request 204 is received from the processor, the counter 202 decreases the count. The count value of the counter 202 is compared with zero by a comparator 205. When the count value of the counter 202 reaches zero, a signal is sent to a synchronization completion notice transmitting section 206, which transmits synchronization completion notices 207 to the N processors. Also, the count value of the counter 202 is set to the initial value N 203.

Figure 3:
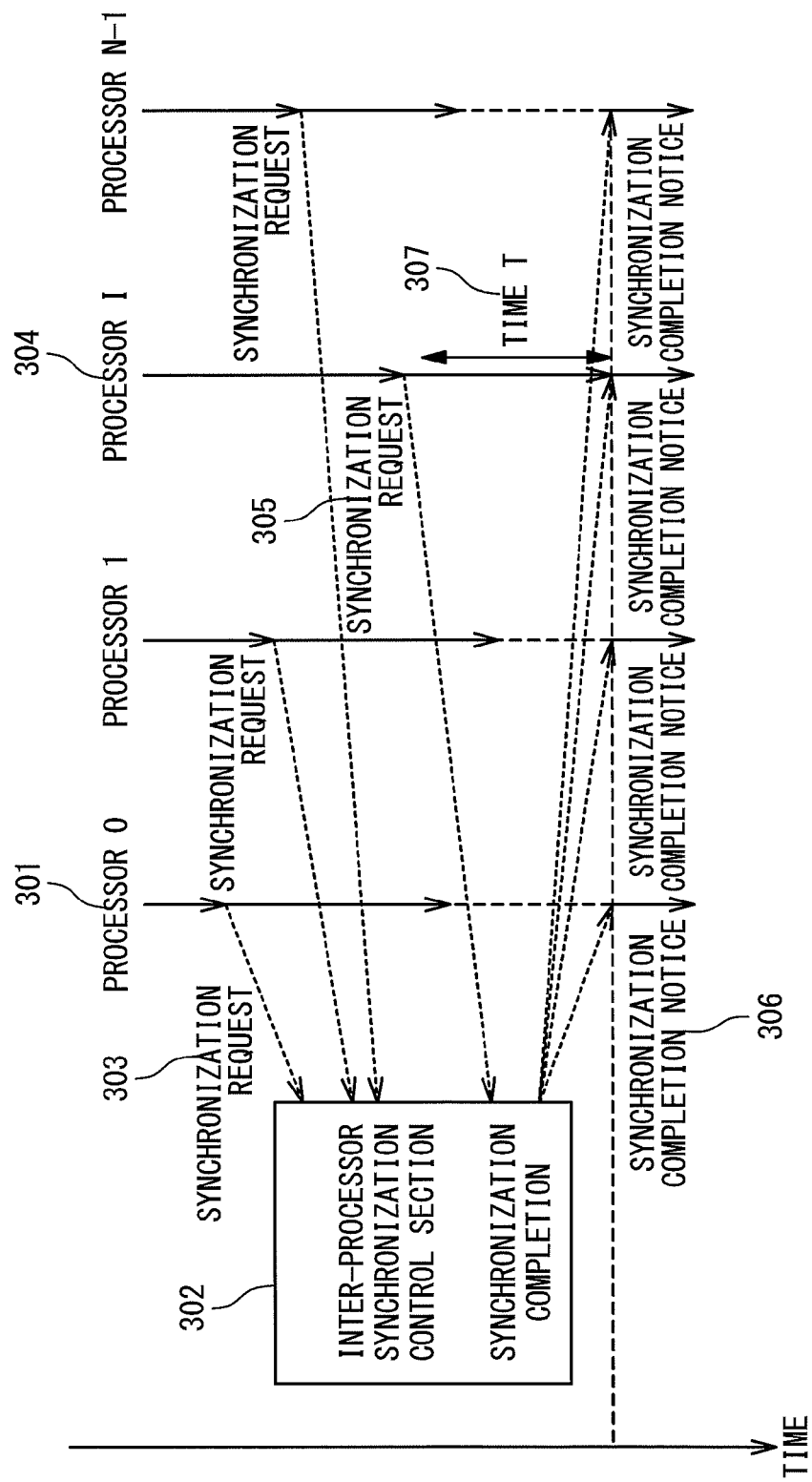
FIG. 3 is a diagram illustrating an operation of the inter-processor synchronization control section according to the first exemplary embodiment.

FIG. 3 shows an operation of the inter-processor synchronization control section 103 of FIG. 1. In FIG. 3, time passes from top to bottom. In FIG. 3, the N processors including a processor 0 301, processors 1 to I−1, a processor I 304, and processors I+1 to N−1 are connected to an inter-processor synchronization control section 302. A synchronization request 303 is transmitted from the processor 0 301, as well as the other processors, and finally the processor I 304 transmits an $N^{th}$ synchronization request 305. Moreover, after synchronization is completed, the processor 0 301 receives a synchronization completion notice 306, as well as the other processors. Here, a time period from when the processor I 304 executes an inter-processor synchronization command and transmits the final synchronization request 305 to when its synchronization completion notice arrives is T 307. The time period T 307 is a value previously determined based on the configuration of the parallel computer, by that of the inter-processor synchronization control section 103.

Figure 4:
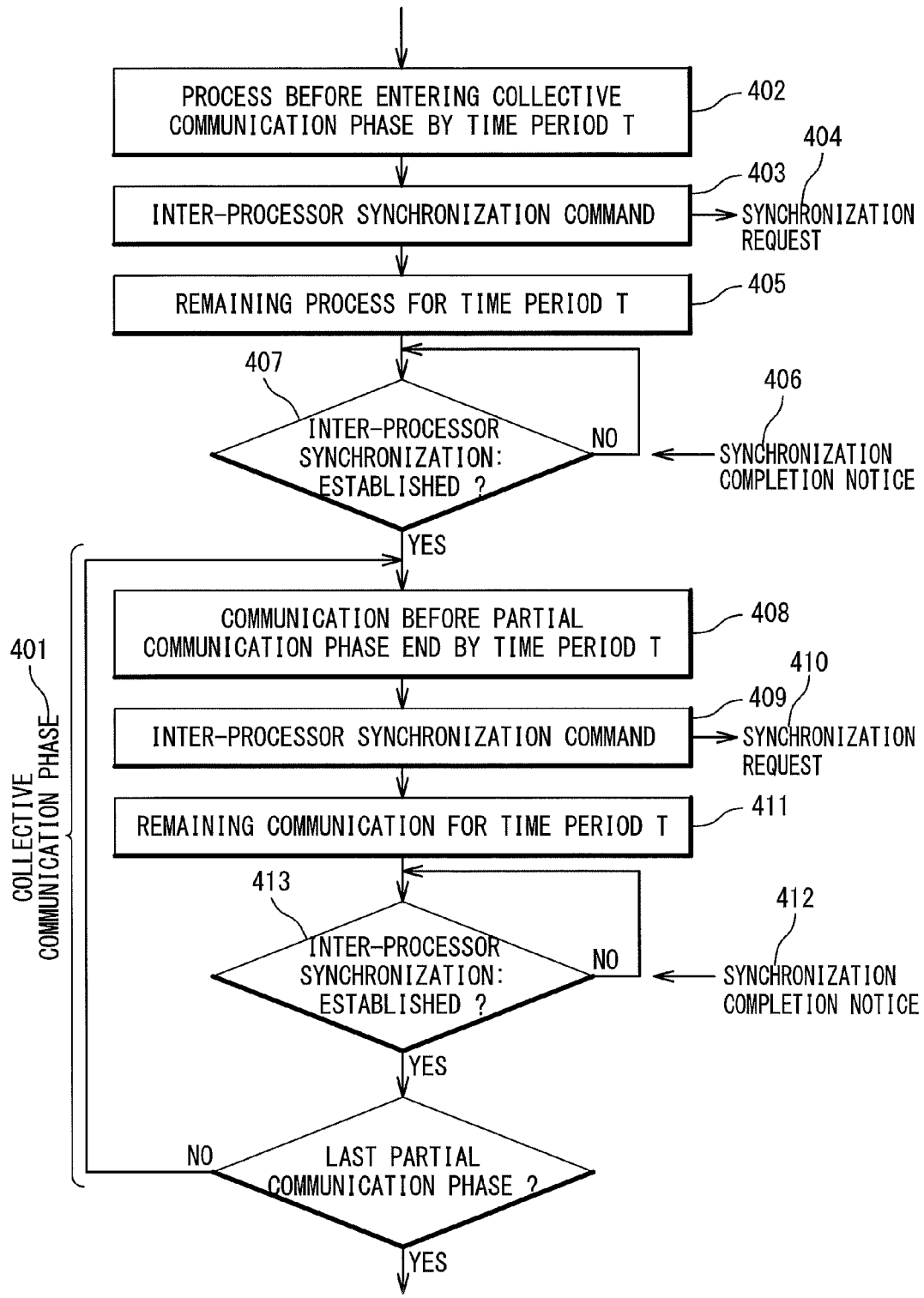
FIG. 4 is a time chart illustrating operations of processors according to the first exemplary embodiment.

Next, referring to a time chart of FIG. 4, processes performed by all the processors will be described. First, a process before entering a collective communication phase 401 will be described. A process 402 is executed for a time period T before entering the collective communication phase. At a time at which a remaining processing time is the time period T, an inter-processor synchronization command 403 is executed. As a result, a synchronization request 404 is transmitted. Then, a remaining process 405 for the time period T is executed. The completion of inter-processor synchronization, i.e. reception of synchronization completion notice 406 is awaited (407). When the inter-processor synchronization is completed, the control flow enters the collective communication phase 401.

In the collective communication phase 401, communication 408 is performed for the time period T before a partial communication phase ends. When this partial communication phase ends after the time period T, an inter-processor synchronization command 409 is executed. As a result, a synchronization request 410 is transmitted. Then, remaining communication 411 for the time period T in the partial communication phase is performed. The completion of inter-processor synchronization, i.e. reception of synchronization completion notice 412 is awaited (413). When the inter-processor synchronization is completed, the control flow enters a next partial communication phase. This is repeated until a final partial communication phase, i.e. the end of the collective communication phase.

As described above, in the first exemplary embodiment, the processing and the communication can be overlapped with the inter-processor synchronization by executing the inter-processor synchronization command in advance, and the time period required for inter-processor synchronization can be hidden. As a result, the speed-up of the collective communication can be achieved.

FIG. 5(A), (B) show operations in a case (A) that a time period actually required for the remaining processing and communication to the time period T is equal to or smaller than the time period T and in a case (B) that it is larger than the time period T. In the case (A) where the actually required time period is equal to or smaller than the time period T, a time period for waiting for synchronization completion notice is overhead. On the other hand, in the case (B) where the actually required time period is larger than the time period T, only the processor I 304 which has finally executed the synchronization command delays in the shift to a next partial communication phase 501. That is, the current phase and the next partial communication phase overlap with each other. However, since this overlapping time period is smaller than the time period required for inter-processor synchronization, performance degradation is less than in the related technique in which the entire time period of inter-processor synchronization is overhead.

Second Exemplary Embodiment

Figure 6:
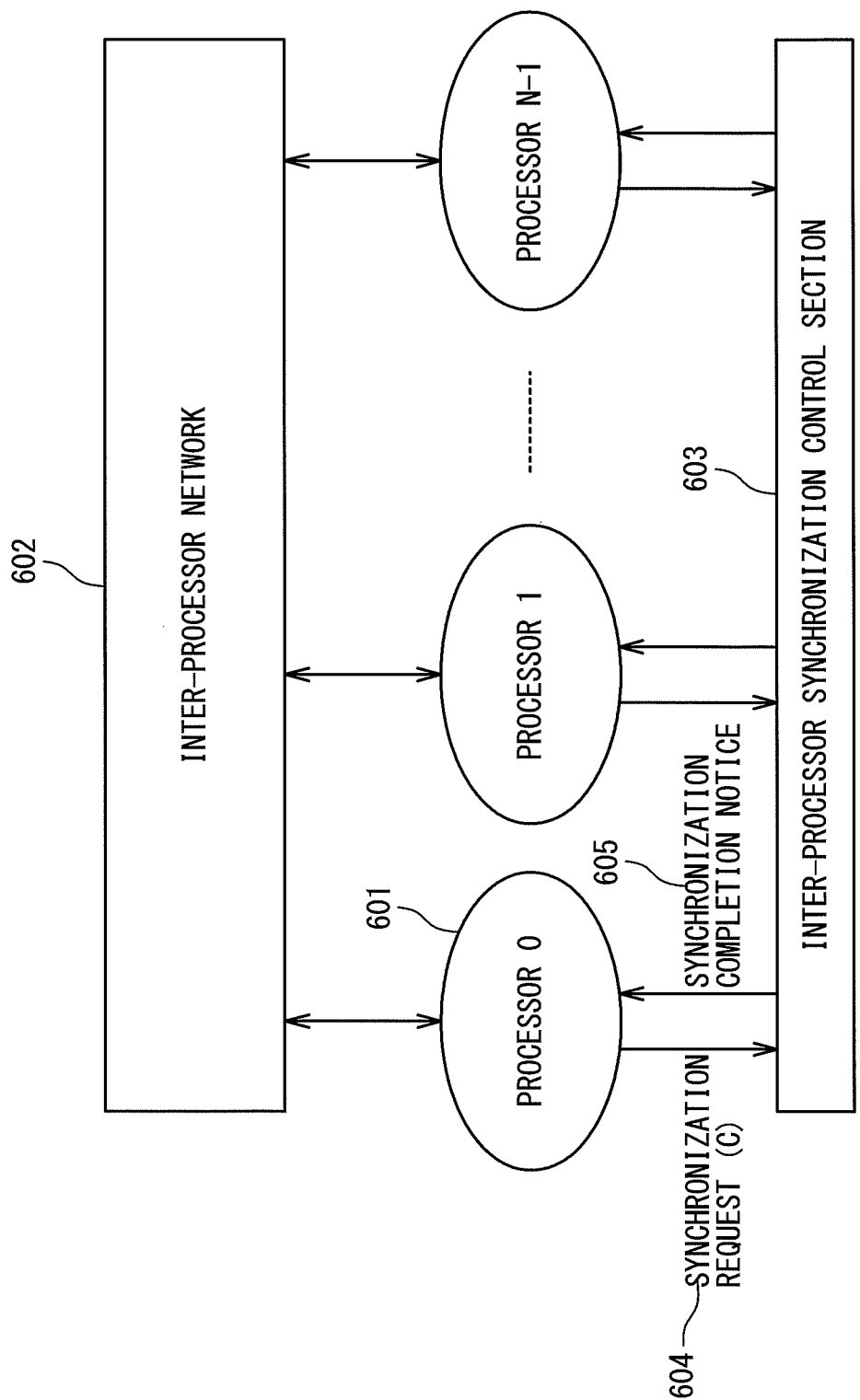
FIG. 6 is a diagram showing the parallel computer according to a second exemplary embodiment of the present invention.

FIG. 6 shows a parallel computer according to a second exemplary embodiment of the present invention. In FIG. 6, the parallel computer has a plurality of processors including a processor 0 601 and a processor 1 to a processor N−1. The plurality of processors are connected by an inter-processor network 602. The plurality of processors are also connected to an inter-processor synchronization control section 603. When the processor 0 601 executes an inter-processor synchronization command with as an argument, a time period C required for inter-processor synchronization, a synchronization request (C) 604 is transmitted to the inter-processor synchronization control section 603. When receiving the synchronization requests (C) from all the processors, the inter-processor synchronization control section 603 waits for a period corresponding to a difference between the time period C added to the final synchronization request (C) and the time period T required for inter-processor synchronization when the inter-processor synchronization control section 603 is used, and then transmits a synchronization completion notice 605 to the processor 0 601, and also transmits the synchronization completion notices to all the other processors.

Therefore, in the second exemplary embodiment, the time period required for inter-processor synchronization is C. The time period T is, a value determined previously based on the configuration of the parallel computer, i.e. that of the inter-processor synchronization control section 603, like the first exemplary embodiment. The time period C as the argument of the synchronization request (C) is a value determined based on timing at which the inter-processor synchronization command is executed. Since the inter-processor synchronization command is executed during a process in execution (calculation or communication), the timing for the inter-processor synchronization command to be executed depends on the process in execution. For example, there is a possibility that the time period C takes a different value for every phase. However, in the second exemplary embodiment, it is assumed that the processors perform almost the same processes and that the arguments C of the synchronization requests (C) 604 at a certain phase take a same value over all the processors.

Figure 7:
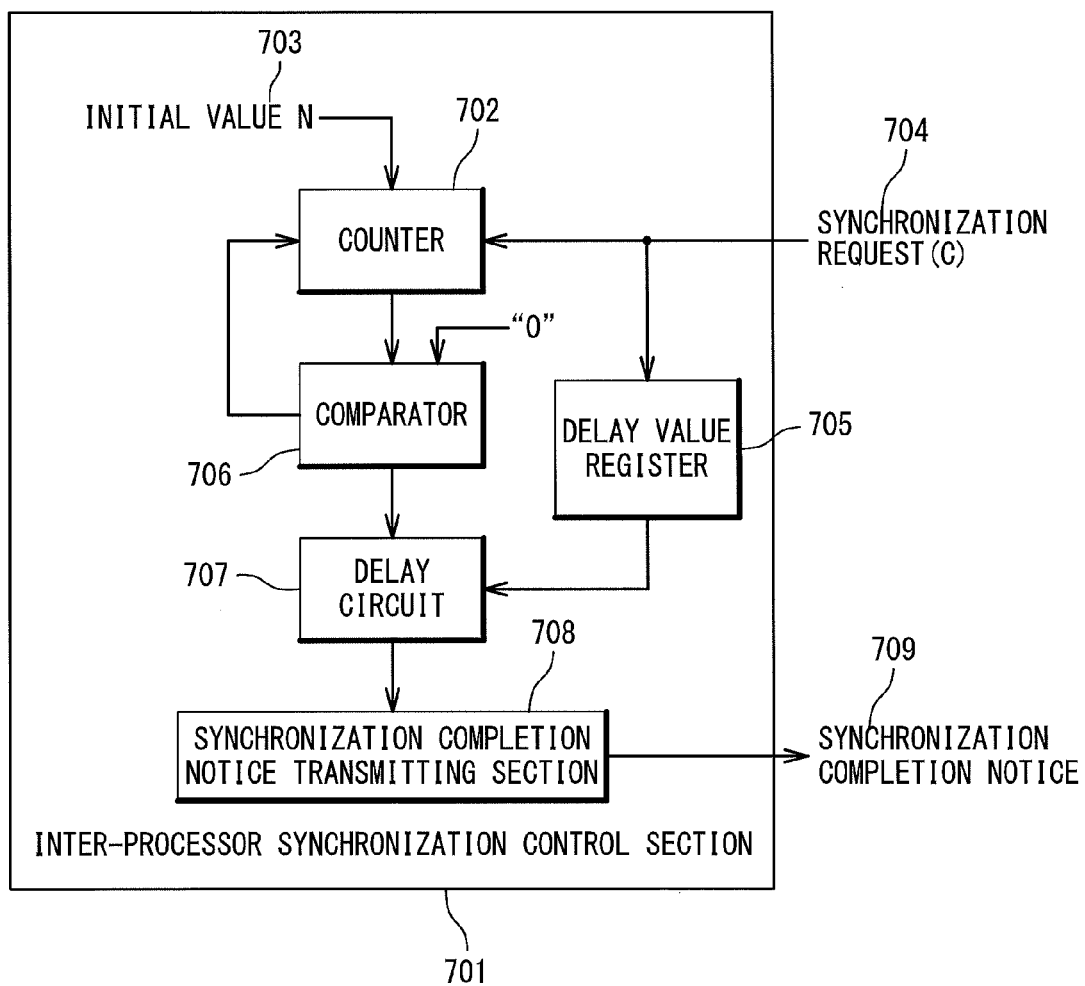
FIG. 7 is a diagram showing a configuration example of an inter-processor synchronization control section according to the second exemplary embodiment.

FIG. 7 shows one configuration example of the inter-processor synchronization control section 603 shown in FIG. 6. In an inter-processor synchronization control section 701, a counter 702 is built therein and a processor count N 703 is set as an initial value. When a synchronization request (C) 704 is received from one processor, a delay value C thereof is stored in a delay value register 705 and the counter 702 is decreased by one. The value of the counter 702 is compared with zero by a comparator 706. When the value of the counter 702 reaches zero, a signal is transmitted to a delay circuit 707. In the delay circuit 707, a delay is performed which corresponds to a value obtained by subtracting from the value in the delay value register 705, the time period T required for inter-processor synchronization when the inter-processor synchronization control section 701 is used, and it is reported to a synchronization completion notice transmitting section 708 that the counter 702 has reached zero. Then, the synchronization completion notice transmitting section 708 transmits synchronization completion notices 709 to N processors. In addition, the value of the counter 702 is set to the initial value N 703.

Figure 8:
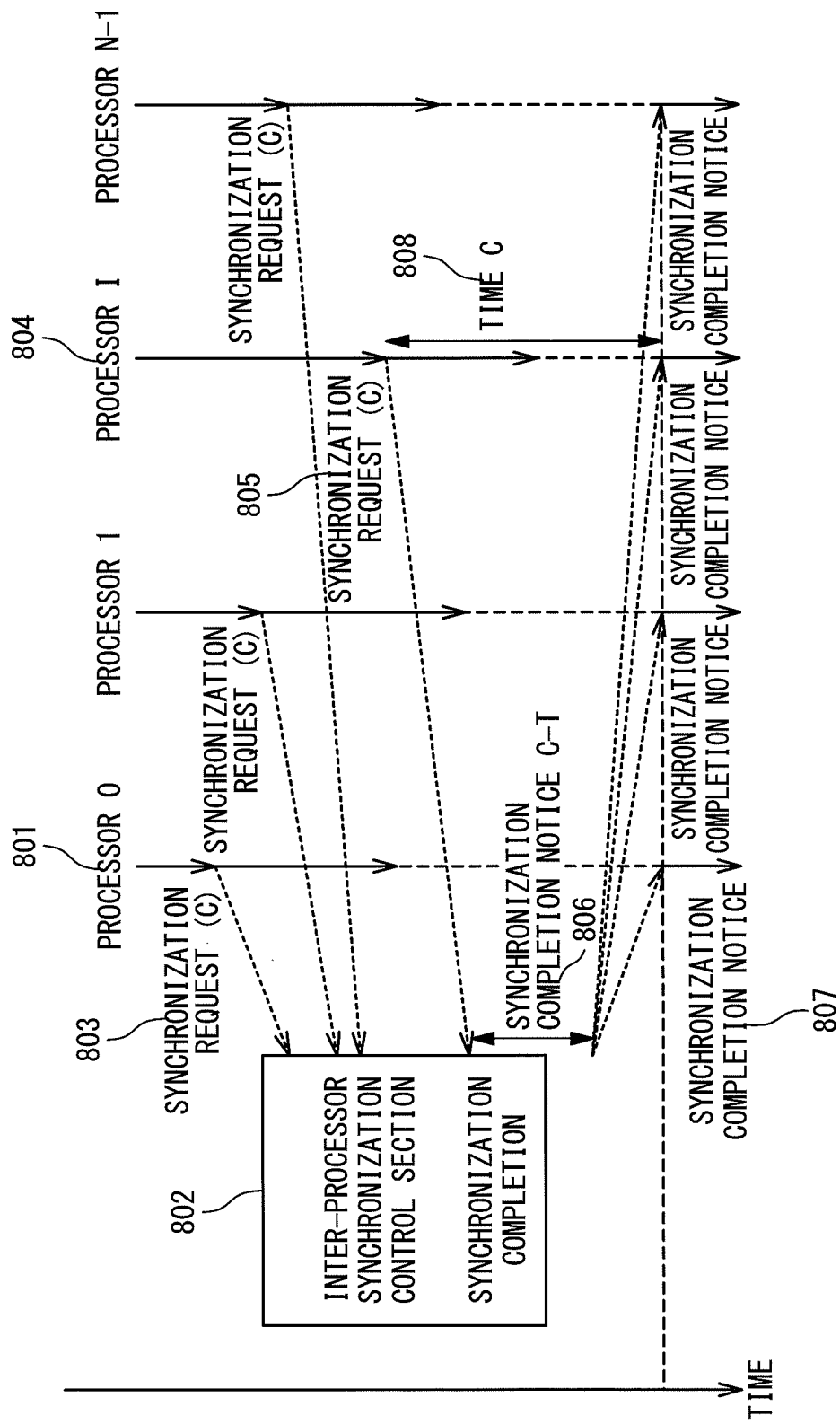
FIG. 8 is a diagram illustrating an operation of the inter-processor synchronization control section according to the second exemplary embodiment.

FIG. 8 shows an operation of the inter-processor synchronization control section 603 of FIG. 6. In FIG. 8, time flows from top to bottom. In FIG. 8, N processors including a processor 0 801, processors 1 to I−1, a processor I 804, and processors I+1 to N−1 are connected to an inter-processor synchronization control section 802. A synchronization request (C) 803 is transmitted from the processor 0 801, as well as the other processors. Finally, the processor I 804 transmits an $N^{th}$ synchronization request (C) 805. As shown in FIG. 8, in the second exemplary embodiment, where a time period required for inter-processor synchronization in the inter-processor synchronization control section 802 is T, there is a delay from the synchronization completion by a time period C-T 806 which is a difference between a time period C specified by the synchronization request (C) 805 and the time period T. After passage of a delay time, the inter-processor synchronization control section 802 transmits synchronization completion notices 807 to the processor 0 801, as well as the other processors. A time period from when the processor I 804, which has issued the final synchronization request (C) 805, executes an inter-processor synchronization command and transmits the synchronization request (C) 805 to when its synchronization completion notice arrives is C 808.

Figure 9:
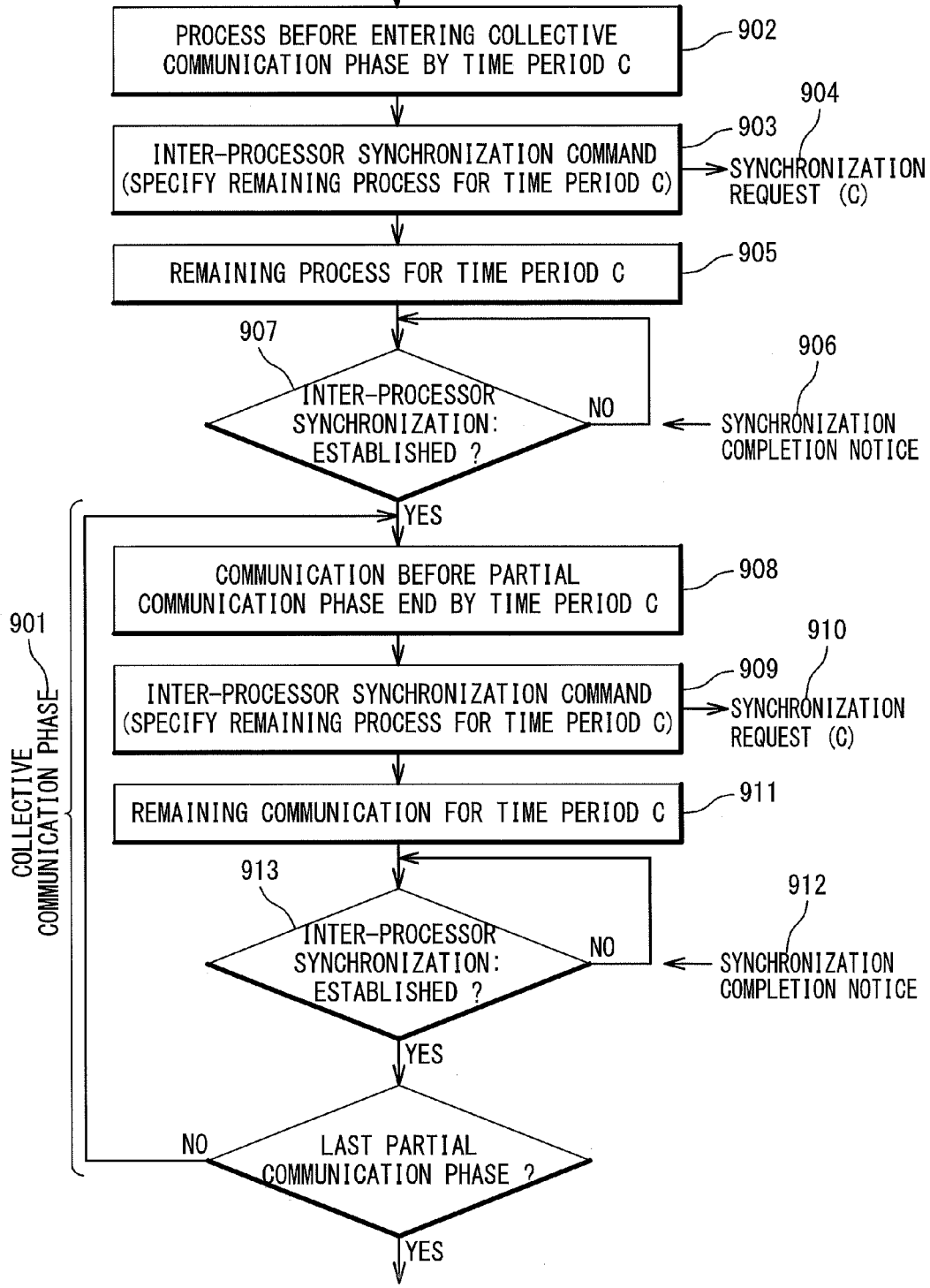
FIG. 9 is a time chart illustrating operations of processors according to the second exemplary embodiment.

Next, using a time chart of FIG. 9, processes executed by all the processors will be described. First, the process before entering a collective communication phase 901 will be described. A process 902 is executed for the time period C before entering the collective communication phase. At a time at which a remaining processing time period is the time period C, the time period C is specified and an inter-processor synchronization command 903 is executed. As a result, a synchronization request (C) 904 is transmitted. Then, a remaining process 905 for the time period C is executed. Then, the completion of inter-processor synchronization, i.e. reception of a synchronization completion notice 906 is awaited (907). When the inter-processor synchronization is completed, the process flow enters the collective communication phase 901.

In the collective communication phase 901, a communication 908 is performed for the time period C before a partial communication phase ends. At the time when this partial communication phase ends in the time period C, the time period C is specified and an inter-processor synchronization command 909 is executed. As a result, a synchronization request (C) 910 is transmitted. Then, a communication 911 for the time period C in the remaining partial communication phase is performed. Then, completion of inter-processor synchronization, i.e. reception of a synchronization completion notice 912 is awaited (913). When the inter-processor synchronization is completed, the process flow enters a next partial communication phase. This is repeated until a final partial communication phase, that is, until end of the collective communication phase.

As described with reference to FIG. 6, there is a possibility that the value C is different for every phase. That is, there is a possibility that the value C of the synchronization request (C) 904 before entering the collective communication phase 901 and the value C of the synchronization request (C) 910 at the collective communication phase 901 are differ from each other. Moreover, if processing of the synchronization request (C) 910 is different for every phase in the collective communication phase 901, there is a possibility that the value C for every phase is different.

The inter-processor synchronization control section in the second exemplary embodiment can specify the time period C required for inter-processor synchronization. Consequently, regardless of the time period T required for inter-processor synchronization, the timing at which the inter-processor synchronization command is executed can be arbitrarily set depending on processing contents.

Third Exemplary Embodiment

Figure 12:
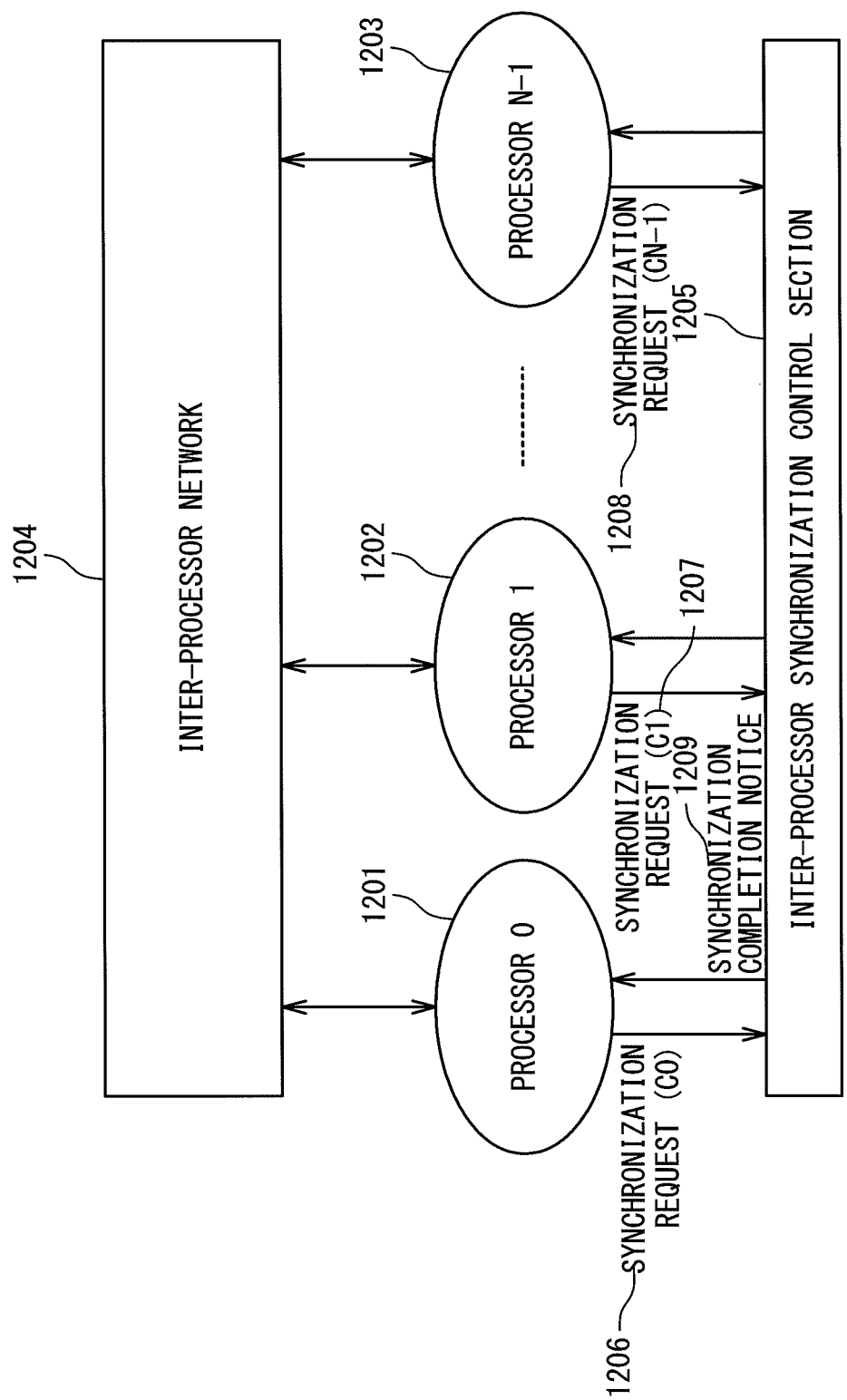
FIG. 12 is a diagram showing a parallel computer according to the third exemplary embodiment of the present invention.

FIG. 12 shows the parallel computer according to a third exemplary embodiment of the present invention. In FIG. 12, the parallel computer has a plurality of processors including a processor 0 1201 and a processor 1 1202 to a processor N−1 1203. The plurality of processors are connected by an inter-processor network 1204. Moreover, the plurality of processors are connected to an inter-processor synchronization control section 1205. When the processor 0 1201 executes an inter-processor synchronization command having as an argument, a time period C0 required for inter-processor synchronization, a synchronization request (C0) 1206 is transmitted to the inter-processor synchronization control section 1205. When the processor 1 1202 executes an inter-processor synchronization command having as an argument, a time period C1 required for inter-processor synchronization, a synchronization request (C1) 1207 is transmitted to the inter-processor synchronization control section 1205. When the processor N−1 1203 executes an inter-processor synchronization command having as the argument, a time period CN−1 required for inter-processor synchronization, a synchronization request (CN−1) 1208 is transmitted to the inter-processor synchronization control section 1205. When receiving synchronization requests (C#) from all the processors, the inter-processor synchronization control section 1205 waits for a period corresponding to a difference CJ'−T between a time period CJ' transmitted from a processor J which requires the longest time period for inter-processor synchronization and time period T required for the inter-processor synchronization when the inter-processor synchronization control section 1205 is used, and then transmits synchronization completion notices 1209 to processor 0 1201, as well as all the other processors.

Here, the time period T is a value previously determined based on a configuration of the parallel computer, such as that of the inter-processor synchronization control section 1205, as in the first and second exemplary embodiments. Moreover, in the third exemplary embodiment, the periods C0, C1, and CN−1 as the arguments of the synchronization request (C0) 1206, the synchronization request (C1) 1207, and the synchronization request (CN−1) 1208 are values determined based on timings at which the respective processors execute the inter-processor synchronization commands. When contents of the processes in the respective processors are different from each other, there is a possibility that the timings at which the inter-processor synchronization commands are executed are different from each other so that the values of C0, C1, and CN−1 are different form each other. Further, even in the same processor, the processing varies depending on a phase and there is a possibility that the timing at which the inter-processor synchronization command is executed varies depending on the phase.

Figure 13:
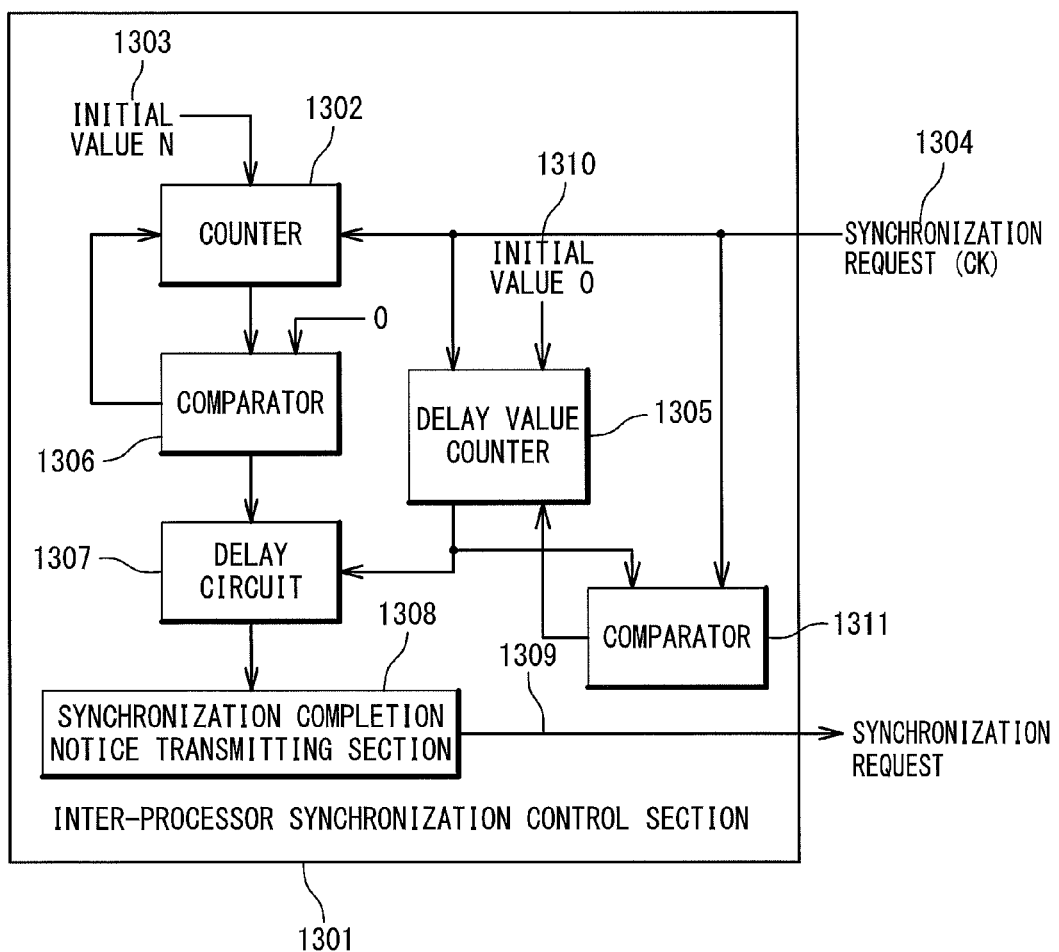
FIG. 13 is a diagram showing a configuration example of an inter-processor synchronization control section according to the third exemplary embodiment.

FIG. 13 shows one configuration example of the inter-processor synchronization control section 1205 shown in FIG. 12. In an inter-processor synchronization control section 1301, a counter 1302 is built therein and a processor count N 1303 is set as an initial value. Moreover, in the inter-processor synchronization control section 1301, a delay value counter 1305 is provided, and "0" 1310 is set as an initial value. When a synchronization request (CK) 1304 is received from a certain processor K, a delay value CK thereof and a value of the delay value counter 1305 are compared with each other by a comparator 1311. If "CK>the value of the delay value counter 1305", the delay value CK is stored into the delay value counter 1305. If not "CK>the value of the delay value counter 1305", the delay value counter 1305 is not overwritten. Then, the counter 1302 is decreased by "1". Here, the value of the delay value counter 1305 is counted down until reaching 0 over passage of time. On the other hand, a value of the counter 1302 is compared with zero by a comparator 1306. When synchronization requests from all the processors arrive and the value of the counter 1302 reaches zero, a signal of this is transmitted to a delay circuit 1307. The delay circuit 1307 reports to a synchronization completion notice transmitting section 1308 that the counter 1302 reaches zero, after a delay corresponding to a value (CJ'−T) obtained by subtracting a time period T required for inter-processor synchronization in this parallel computer from a value CJ' of the delay value counter 1305 at this point. Then, the synchronization completion notice transmitting section 1308 transmits synchronization completion notices 1309 to the N processors. In addition, the value of the counter 1302 is set to the initial value "N" 1303, and the value of the delay value counter is set to the initial value "0" 1310.

FIG. 14 shows an operation of the inter-processor synchronization control section 1301 of FIG. 13. In FIG. 14, time flows from top to bottom. In FIG. 14, the N processors, i.e. a processor 0 1401, a processor 1 1402, and a processor N−1 1404 are connected to an inter-processor synchronization control section 1405. A synchronization request (C0) 1406, a synchronization request (C1) 1407, and a synchronization request (CN−1) 1408 are transmitted from the processor 0 1401, the processor 1402, and the processor N−1 1404, respectively, and finally, the processor 1 1403 transmits an $N^{th}$ synchronization request (CI) 1409. Here, it is assumed that a value of the delay value counter in the inter-processor synchronization control section 1405 at this point is CJ' (value obtained by counting down from CJ over passage of time) and that time period required for inter-processor synchronization in this parallel computer is T. In this case, the inter-processor synchronization control section 1405 provides a delay time corresponding to a value obtained by subtracting the time period T from one of CJ' and CI, which is larger. The inter-processor synchronization control section 1405 compares the time period CI specified by the final synchronization request (CI) 1409 with the value CJ' of the delay value counter at this point. If "CI<CJ", as shown in FIG. 14, the inter-processor synchronization control section 1405 provides a delay time corresponding to a value obtained by subtracting the time period T from a time period CJ'. After passage of the delay time, the inter-processor synchronization control section 1405 transmits a synchronization completion notice 1411 to the processor 0 1401, as well as the other processors. A time period from when the processor J transmits a synchronization request (CJ) of the delay value CJ to when a synchronization completion notice arrives at the processor J is CJ.

Next, with reference to a time chart of FIG. 15, processing performed by all the processors will be described. Here, the description will be given, taking one processor K as an example. First, the processing before entering a collective communication phase 1501 will be described. A process 1502 is executed for a time period CK before entering the collective communication phase. When a remaining process time until entering the collective communication phase reaches the time period CK, the time period CK is specified and an inter-processor synchronization command 1503 is executed. As a result, a synchronization request (CK) 1504 is transmitted. Then, a remaining process 1505 for the time period CK is executed. Then, completion of inter-processor synchronization, that is, reception of synchronization completion notice 1506 is awaited (1507). When the inter-processor synchronization is completed, the process flow enters the collective communication phase 1501.

In the collective communication phase 1501, communication 1508 for the time period CK before end of a partial communication phase is performed. When this partial communication phase ends before the time period CK, the time period CK is specified and an inter-processor synchronization command 1509 is executed. As a result, a synchronization request (CK) 1510 is transmitted. Then, communication 1511 of the remaining partial communication phase is performed for the time period CK. Then, realization of inter-processor synchronization, that is, reception of synchronization completion notice 1512 is awaited (1513). When the inter-processor synchronization has been realized, the processing enters a next partial communication phase. This is repeated until a final partial communication phase, that is, until end of the collective communication phase.

The inter-processor synchronization control section in the third exemplary embodiment can specify, for each of the processors, the time period CK required for inter-processor synchronization. This makes it possible to arbitrarily set a time at which the inter-processor synchronization command is executed, for each of the processors, regardless of the time period T required for inter-processor synchronization in the parallel computer. As described with reference to FIG. 12, there is a possibility that the value CK is different depending on a phase. That is, there is a possibility that the value CK of the synchronization request (CK) 1504 before entering the collective communication phase 1501 and the value CK of the synchronization request (CK) 1510 in the collective communication phase 1501 are different from each other. Moreover, if a process of the synchronization request (CK) 1510 in the collective communication phase 1501 varies depending on a phase, there is a possibility that the value CK varies depending on the phase.

Effects of First to Third Exemplary Embodiments

In the first to third exemplary embodiments, since the inter-processor synchronization command is executed in advance, the processing and the communication can be overlapped with the inter-processor synchronization, and thereby the time period required for inter-processor synchronization can be hidden. As a result, the speedup of the collective communication can be achieved.

That is, one effect in the first to third exemplary embodiments is in that the time period required for inter-processor synchronization can be reduced, thereby permitting the speedup of the collective communication, although the required time period is an overhead upon synchronizing time of entering the collective communication phase and time of entering the partial communication phase between all processors participating in the collective communication. A reason is in that the inter-processor synchronization is performed in advance for the time period required for the inter-processor synchronization so that the process immediately before the collective communication phase and the communication immediately before the partial communication phase are performed in such a manner to overlap with the inter-processor synchronization, thereby hiding the time period required for inter-processor synchronization.

In conventional inter-processor synchronization, it is necessary to guarantee that a process reaches a synchronization point, that is, the process before the synchronization point has ended. On the other hand, in the inter-processor synchronization in the first to third exemplary embodiments, it is targeted to synchronize the times at which the processors enter a next phase, as much as possible. In some cases, it is not necessarily guaranteed that when the inter-processor synchronization is completed, the processes of all the processors have ended, that is, the process flow is possible to enter the next phase. Therefore, there is a possibility that one of the processors delays later than the other processors with respect to the time of entering the next phase. However, it is thought that a delay time is short so that performance degradation is very little as compared to a case where the entire time period required for inter-processor synchronization is an overhead like the related technique described above.

Figure 10:
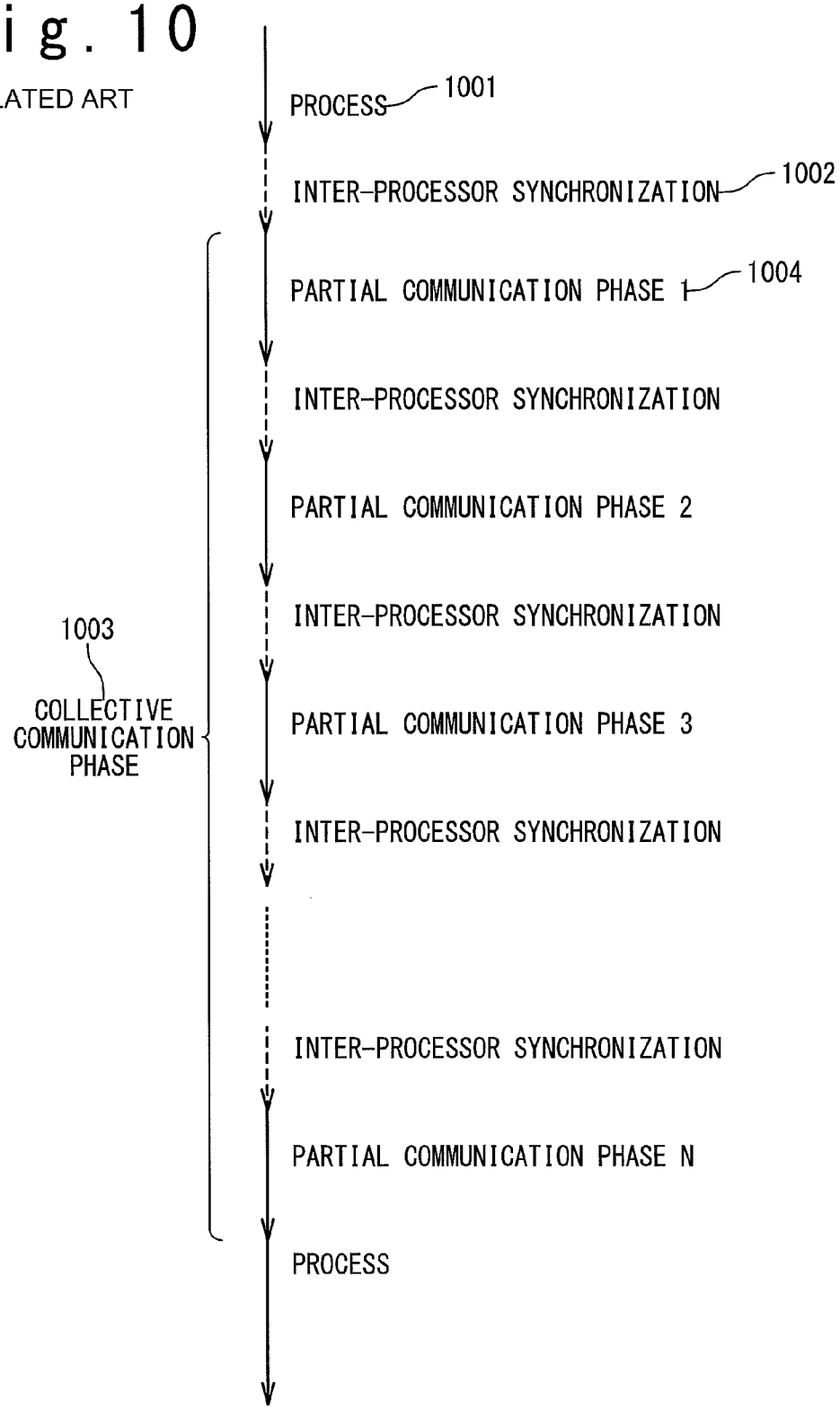
FIG. 10 is a timing chart illustrating communication phases in a related technique.

FIG. 10 shows a time chart of collective communication described in Japanese Patent No. 2601591. In this related technique, after a process 1001 before entering a collective communication phase 1003, inter-processor synchronization 1002 is performed before a partial communication phase 1 1004 of the collective communication phase 1003, to synchronize times of entering the partial communication phase 1 1004.

Figure 11:
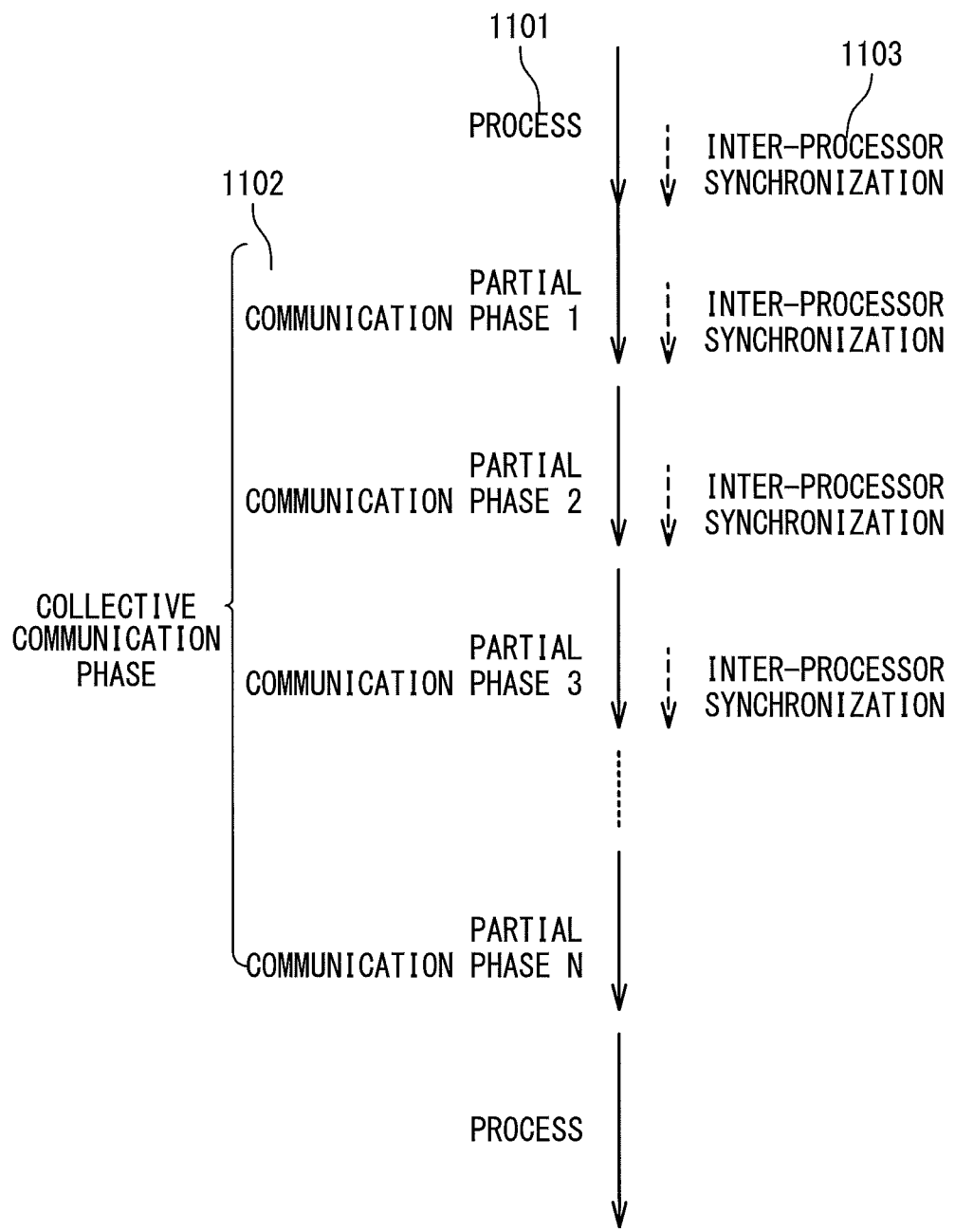
FIG. 11 is a timing chart illustrating communication phases according to the first to third exemplary embodiments.

FIG. 11 shows a time chart of the communication in the first to third exemplary embodiments. In FIG. 11, a time period for inter-processor synchronization 1103 overlaps with a time period for a process 1101. The time period for the inter-processor synchronization also overlaps with a time period for communication in a partial communication phase 1 1102. As shown in FIG. 11, collective communication is speeded up.

It would be effective that the present invention is applied to a large-scale parallel computer which requires a long time for inter-processor synchronization.

The present invention has been described with reference to the exemplary embodiments, but the present invention is not limited to the aforementioned exemplary embodiments. Various modifications to the configuration of the present invention can be made within a scope of the present invention in a manner understandable to those skilled in the art.

The invention claimed is:

1. A communication method in a parallel computer comprising:
   a plurality of processors;
   an inter-processor network connected to said plurality processors; and
   an inter-processor synchronization control section configured to establish inter-processor synchronization among said plurality of processors,
   said communication method comprising:
   said inter-processor synchronization control section executing the inter-processor synchronization to overlap with a previous process before a collective communication phase, in which communications are performed at a same time among said plurality of processors through said inter-processor network, or a communication of a partial communication phase during a time period required for the inter-processor synchronization, said communication method further comprising:
   (1a) each of said plurality of processors starting the previous process before entering the collective communication phase;
   (1b) said each processor executing a synchronization command in advance at a time when a portion of the previous process for a predetermined time period t1 is left;
   (1c) said each processor sending a synchronization request to said inter-processor synchronization control section in the execution of the synchronization command;

(1d) said each processor receiving a synchronization completion notice;

(1e) said each processor executing the previous process in parallel with said (1b) to (1d); and (1f) after said (1e), said plurality of processors entering the collective communication phase after confirmation of reception of the synchronization completion notices, wherein said inter-processor synchronization control section executing the inter-processor synchronization comprises:

(1g) said inter-processor synchronization control section receiving the synchronization, requests from all of said processors; and (1h) said inter-processor synchronization control section transmitting the synchronization completion notice to said each processor, if the synchronization request is received from said each processor and a synchronization condition is met, the communication method further comprises:

(2a) entering the collective communication phase which is divided into a plurality of partial communication phases;

(2b) entering one of said plurality of partial communication phases;

(2c) said each processor starting a partial communication with another of said plurality of processors;

(2d) said each processor executing the synchronization command in advance in a state that a portion of said partial communication for a predetermined time period t2 is left;

(2e) said each processor sending out the synchronization request to said inter-processor synchronization control section in the execution of the synchronization command;

(2f) said inter-processor synchronization control section receiving the synchronization request from said each processor;

(2g) said inter-processor synchronization control section transmitting the synchronization completion notice to said each processor when the synchronization requests are received from all of said plurality of processors and the synchronization condition is met;

(2h) said each processor receiving the synchronization completion notice;

(2i) said each processor continuing the partial communication in parallel to said (2d) to (2h); and (2j) after said (2i), said plurality of processors entering a next one of said plurality of partial communication phases after confirmation of reception of the synchronization completion notices.

2. The communication method according to claim 1, wherein as the predetermined time period t2, a time period T is used which is determined in advance based on a configuration of said parallel computer and which is from a time when a last one of said plurality of processors executes the synchronization command last to a time when said last processor receives synchronization completion notice.

3. The communication method according to claim 1, wherein a time period which is determined in advance based on a configuration of said parallel computer and which is from a time when a last one of said plurality of processors executes the synchronization command last to a time when said last processor receives synchronization completion notice is T, and wherein as the predetermined time period t2, a time period C is used which is determined based on a timing at which the synchronization command is executed, depending on the partial communication and which is equal to or larger than the time period T.

4. The communication method according to claim 3, wherein said (2g) comprises:

said inter-processor synchronization control section transmitting the synchronization completion notice to said each processor such that a time period from a time when said last processor executes the synchronization command depending on the partial communication to a time when the synchronization completion notice is received is same as said time period C.

5. The communication method according to claim 1, wherein a time period which is determined in advance based on a configuration of said parallel computer and which is from a time when a last one of said plurality of processors executes the synchronization command last to a time when said last processor receives synchronization completion notice is T, wherein as the predetermined time period t2, a time period CJ is used which is determined based on a timing at which the synchronization command is executed, depending on the partial communication executed by said each processor and which is equal to or larger than the time period T, and wherein said CJ is for a $J^{th}$ processor of said plurality of processors, and when the number of said plurality of processors is N, J=0, 1, . . . , N−1 and CJ=C0, C1, . . . , CN−1.

6. The communication method according to claim 5, wherein said (2g) comprises:

said inter-processor synchronization control section transmitting the synchronization completion notice to said each processor such that a time period from a time when a $K^{th}$ processor of said plurality of processors executes the synchronization command to a time when the synchronization completion notice is received is same as said time period CJ (here, J=K), when said $K^{th}$ processor has a the latest time among times obtained by adding said time period CJ to times at which the synchronization commands are executed.

7. A parallel computer comprising:

a plurality of processors;

an inter-processor network configured to connect said plurality of processors; and an inter-processor synchronization control section configured to establish inter-processor synchronization among said plurality of processors, wherein said inter-processor synchronization control section executes the inter-processor synchronization to overlap with a previous process before a collective communication phase, in which communications are performed at a same time among said plurality of processors through said inter-processor network, or a communication of a partial communication phase during a time period required for the inter-processor synchronization, and wherein each of said plurality of processors:

(3a) starts a previous process before a collective communication phase in which communications are performed at a same time among said plurality of processors through said inter-processor network; and (3b) executes a synchronization command in advance at a time when a portion of the previous process for a predetermined time period t3 is left, wherein each of said plurality processors:

(3c) sends a synchronization request to said inter-processor synchronization control section in the execution of the synchronization command, wherein said inter-processor synchronization control section:
(3d) receives the synchronization requests from all of said processors; and
(3e) transmits a synchronization completion notice to said each processor, if the synchronization request is received from said each processor and a synchronization condition is met, wherein said each processor:
(3f) receives synchronization said completion; and
(3g) executes the previous process in parallel to said (3b)-(3f), and wherein said plurality of processors:
(3h) after said (3g), said plurality of processors entering the collective communication phase after confirmation of reception of the synchronization completion notices, wherein said plurality of processors:
(4a) enter the collective communication phase which is divided into a plurality of partial communication phases; and
(4b) enter one of said plurality of partial communication phases, wherein said each processor:
(4c) starts partial communication with another of said plurality of processors;
(4d) after said (4c), executes the synchronization command in advance in a state that a portion of said partial communication for a predetermined time period t4 is left; and
(4e) sends out the synchronization request to said inter-processor synchronization control section in the execution of the synchronization command, wherein said inter-processor synchronization control section:
(4f) receives the synchronization request from said each processor; and
(4g) transmits the synchronization completion notice to said each processor when the synchronization requests are received from all of said plurality of processors and the synchronization condition is met, wherein said each processor:
(4h) receives the synchronization completion notice; and
(4i) continues the partial communication in parallel to said (4d) to (4h), and wherein said plurality of processors:
(4j) after said (4i), confirms reception of the synchronization completion notices and then enter a next one of said plurality of partial communication phases after.

8. The parallel computer according to claim 7, wherein said each processor uses as the predetermined time period t4, a time period T which is determined in advance based on a configuration of said parallel computer and which is from a time when a last one of said plurality of processors executes the synchronization command last to a time when said last processor receives synchronization completion notice.

* * * * *